United States Patent
Su et al.

(10) Patent No.: US 10,232,417 B1
(45) Date of Patent: Mar. 19, 2019

(54) RECYCLING METHOD AND APPARATUS FOR SOIL CONTAMINATED WITH MERCURY AND DIOXIN

(71) Applicant: China Petrochemical Development Corporation, Kaohsiung (TW)

(72) Inventors: She-Sheng Su, Kaohsiung (TW); Yi-Shan Shen, Kaohsiung (TW)

(73) Assignee: China Petrochemical Development Corporation, Kaohsiung (TW)

( * ) Notice: Subject to any disclaimer, the term of this patent is extended or adjusted under 35 U.S.C. 154(b) by 0 days.

(21) Appl. No.: 15/840,237

(22) Filed: Dec. 13, 2017

(30) Foreign Application Priority Data

Sep. 5, 2017 (TW) .............................. 106130287 A

(51) Int. Cl.
| | |
|---|---|
| *B09C 1/06* | (2006.01) |
| *B01D 53/00* | (2006.01) |
| *F23J 15/02* | (2006.01) |
| *B01D 39/20* | (2006.01) |
| *F27B 7/20* | (2006.01) |

(52) U.S. Cl.
CPC ............ *B09C 1/06* (2013.01); *B01D 39/2068* (2013.01); *B01D 53/002* (2013.01); *F23J 15/02* (2013.01); *F27B 2007/2091* (2013.01)

(58) Field of Classification Search
CPC combination set(s) only.
See application file for complete search history.

(56) References Cited

U.S. PATENT DOCUMENTS

| 6,350,290 B1* | 2/2002 | Nadeau ............. B01D 46/0005 55/302 |
| 6,399,851 B1* | 6/2002 | Siddle .................... C22B 7/001 110/295 |
| 2002/0033097 A1* | 3/2002 | El-Shoubary .......... B01D 53/02 95/134 |
| 2007/0231073 A1* | 10/2007 | Jiang ....................... B09C 1/06 405/128.7 |

FOREIGN PATENT DOCUMENTS

TW 201408389 A 3/2014

* cited by examiner

*Primary Examiner* — Kyle Armstrong
(74) *Attorney, Agent, or Firm* — Mintz Levin Cohn Ferris Glovsky and Popeo, P.C.; Peter F. Corless; Steven M. Jensen

(57) ABSTRACT

The present disclosure provides a method for recycling soil contaminated with mercury and dioxin. The method includes: desorbing mercury and dioxin from the contaminated soil by an indirect rotary furnace; condensing the mercury and discharging it by a condensing and discharging unit; and a secondary indirect burner for decomposing dioxin at a high temperature, so as for the concentration of the contaminants in the exhaust being examined to meet regulation standards and the treated soil to meet the current regulations. The present disclosure also provides an apparatus for recycling contaminated soil containing mercury and dioxin.

20 Claims, 8 Drawing Sheets

US 10,232,417 B1

RECYCLING METHOD AND APPARATUS FOR SOIL CONTAMINATED WITH MERCURY AND DIOXIN

CROSS-REFERENCE TO RELATED APPLICATION

This application claims under 35 U.S.C. § 119(a) the benefit of Taiwanese Patent Application No. 106130287 filed Sep. 5, 2017, the entire contents of which are incorporated herein by reference.

TECHNICAL FIELD

The present disclosure relates to recycling methods and apparatus for contaminated soil, and more specifically, to a recycling method and apparatus for soil contaminated with mercury and dioxin.

BACKGROUND

The factory of CPDC (TAIL) An-shun site, Tainan, Taiwan was involved in the alkali-chlorine industry in the early years. Since sludge and wastewater were inappropriately discharged, soil at the area of the factory was highly contaminated with dioxin and mercury at the same time, which is very difficult to be remedied.

The existing techniques which have been disclosed for treatment of this kind of highly contaminated soil include heat treatment, adsorption, bacterial degradation and organic solvent extraction methods. Among these, the heat treatment method employs thermal desorption to isolate the contaminants from the soil, and such a heat treatment technique has been described in TW 201408389. It is well known that a considerable amounts of dust will be generated during treatment of the soil, hence, in the process described in TW 201408389, it is easy to block the system by the contaminants since the heat treatment is performed directly, resulting in the problem of instability of the process.

In addition, since the heat treatment process for contaminated soil will generate dust in an amount of 2-3%, about 25% of PM 2.5 based on the total volume of the dust, and additional air pollution problems will be caused if the dust without further treatment spreads into the air.

In view of the foregoing, it is necessary to propose a highly stable recycling method and apparatus for treatment of soil contaminated with mercury and dioxin, in order to solve problems of the existing techniques.

SUMMARY

In order to solve above problems, the present disclosure provides an apparatus for treating oil contaminated with mercury and dioxin, which includes: an indirect heating rotary furnace for housing and heat treating the contaminated soil, so as for the mercury and the dioxin to desorb from the contaminated soil, thereby generating exhaust containing mercury and dioxin and treated soil; a treated soil storage tank in communication with the indirect heating rotary furnace and configured for receiving the treated soil; a first dust-collecting unit in fluid communication with the indirect heating rotary furnace to collect dust in the exhaust; a condensing and recovering unit in fluid communication with the first dust-collecting unit to condense mercury vapor in the exhaust and to discharge liquid mercury; a secondary indirect burner in fluid communication with the condensing and recovering unit and configured for heat treating the condensed exhaust and decomposing dioxin in the condensed exhaust; a second dust-collecting unit in fluid communication with the secondary indirect burner to collect dust in the exhaust from the secondary indirect burner; and a chimney communicated with the second dust-collecting unit to discharge the exhaust from the second dust-collecting unit into the air.

The present disclosure further provides a recycling method for soil contaminated with mercury and dioxin, which includes: performing a heat treatment on the contaminated soil with an indirect heating rotary furnace, so as for the mercury and the dioxin to desorb from the contaminated soil, thereby generating exhaust containing mercury and dioxin and treated soil; collecting dust in the exhaust by a first dust-collecting unit; receiving the exhaust from the first dust-collecting unit by a condensing and recovering unit to condense mercury vapor in the exhaust and discharge liquid crude mercury; passing the condensed exhaust through a secondary indirect burner to decompose the dioxin in the condensed exhaust; adsorbing dust in exhaust from the secondary indirect burner by a second dust-collecting unit; and discharging the exhaust from the second dust-collecting unit into the air through a chimney in communication with the second dust-collecting unit.

By using the recycling method and apparatus provided in the present disclosure, soil highly contaminated with mercury and dioxin can be treated at the same time to make the treated soil and off-gas meet the regulation standards with the cost less than the existing techniques for treatment of contaminated soil. In addition, dust generated during the treatment of contaminated soil can also be decreased to avoid air pollution caused by dust escaping and to prevent the system from being blocked by the contaminants, thereby improving the overall stability of the process.

DETAILED DESCRIPTION OF THE EMBODIMENTS

Hereinafter, implementations of the present disclosure are illustrated in details by particular embodiments, such that anyone skilled in the art can understand easily the advantages and effects based on the content of the present specification. The present disclosure also can be practiced or applied by other different implementations. Every details in the present specification can be modified and altered differently based on different views and applications, without departing from the spirit of the present disclosure. Additionally, all of the ranges and values used herein are inclusive and combinable. Any value or point fallen within the ranges used herein, such as any integer, can be used as the minimum or maximum value to derive a sub-range.

Figure 1:
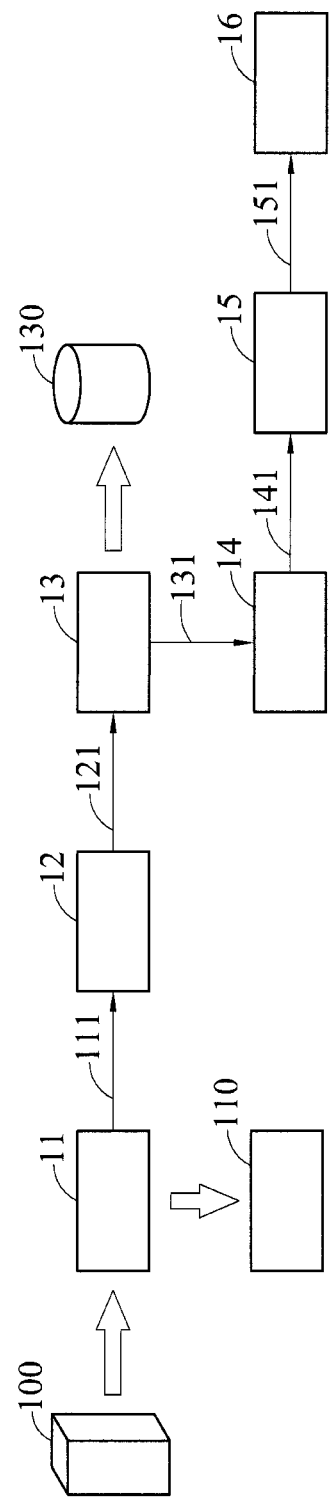
FIG. 1 is a flow chart involving an apparatus for treating soil contaminated with mercury and dioxin.

Referring to FIG. 1, which illustrates an apparatus treating for soil contaminated with mercury and dioxin 100 of the present disclosure, the apparatus includes the followings, in sequence: an indirect heating rotary furnace 11, a treated soil storage tank 110, a first dust-collecting unit 12, a condensing and recovering unit 13, a secondary indirect burner 14, a second dust-collecting unit 15 and a chimney 16, wherein the indirect heating rotary furnace 11 is used for holding and heat treating the contaminated soil 100. In one embodiment, the maximum throughput of contaminated soil is 6 tons/hr, such allows mercury to be desorbed from the contaminated soil 100 and most of dioxin to be decomposed. The indirect heating rotary furnace 11 differs from a direct heating furnace in that the increase in difficulty for subsequent treatment caused by air pollution with contaminated soil can be avoided by using the indirect heating rotary furnace, and therefore, the use of the indirect inner rotary furnace can save investment on apparatus and variable cost of operation.

Figure 2:
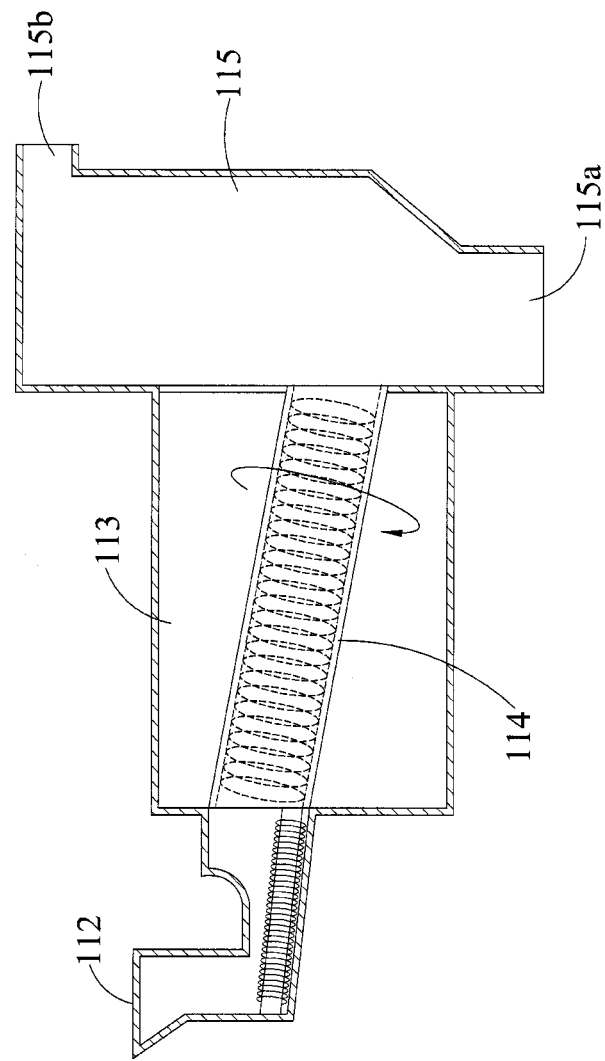
FIG. 2 is a schematic diagram showing the structure of an indirect heating rotary furnace.

FIG. 2 illustrates the structure of the indirect heating rotary furnace 11. The indirect heating rotary furnace 11 includes a feed hopper 112, an inner rotary furnace 114 in communication with the feed hopper 112, an outer fixed furnace 113 covering the inner rotary furnace 114, and a discharging chamber 115. The feed hopper 112 is used for feeding of the contaminated soil 100. The main body of the indirect heating rotary furnace 11 is an inclined (generally, at an inclining angle of 1.25 to 4.75 degrees) cylinder kiln, which includes the outer fixed furnace 113 and the inner rotary furnace 114, and a space between the outer fixed furnace 113 and the inner rotary furnace 114 full of liquid fuel, such as diesel oil. The inner rotary furnace 114 is heated indirectly by burning diesel oil, wherein the temperature can be set to 550 to 650° C., and the heat treatment period using the indirect heating rotary furnace 11 is 20 to 60 minutes. Compared to conventional techniques, with which oxidation or decomposition of dioxin requires a temperature of at least 850° C., the primary cause for the temperature of the indirect heating rotary furnace 11 of the present disclosure being capable of being set to 550 to 650° C. is as follows. The heating device used in the present disclosure heats indirectly, subjecting the contaminated soil 100 to oxygen-deficient combustion in the inner rotary furnace 114. The contaminated soil 100 is agitated through friction of the threads inside the inner rotary furnace 114, and is heated uniformly by rotating the inner rotary furnace 114 at a speed of 1 to 7 rpm. This is helpful to desorb and destroy most of dioxin contaminant, and thereby being capable of carrying out a thermal desorption treatment at a lower temperature. The end of the cylinder kiln is in communication with the discharging chamber 115, to allow the exhaust, which contains mercury and dioxin and is generated during the thermal desorption treatment, to be delivered through an exhaust outlet 115b into the first dust-collecting unit 12 via a pipeline 111. In one embodiment, the output of soil treated by thermal desorption treatment is 1.5 to 4 tons/hr, the treated soil can be discharged through a treated soil outlet 115a into the treated soil storage tank 110 where the treated soil is allowed to cool for detection, the contaminated soil after treatment contains mercury in an amount less than 20 mg/kg and dioxin in an amount less than 1,000 ng International Toxicity Equivalency Quantity (ng I-TEQ/kg). In the contaminated soil treated by the method of the present disclosure, mercury is reduced by 97%, and dioxin contaminant is reduced by 99.87%.

Figure 3:
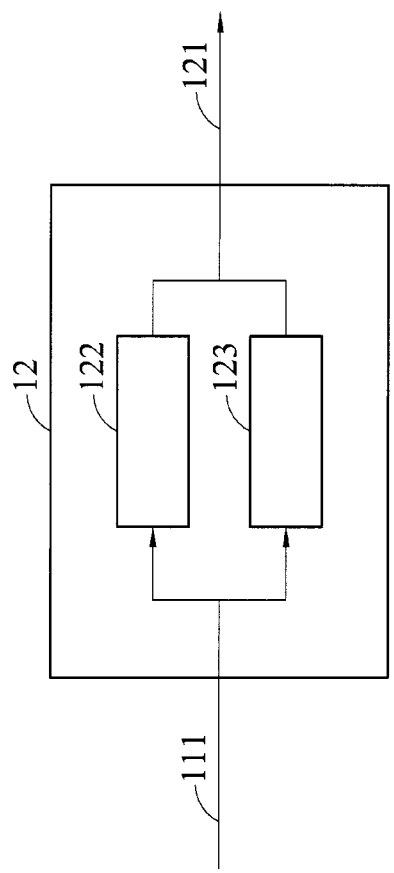
FIG. 3 is a schematic diagram showing a first dust-collecting unit according to an embodiment.

Since a considerable amount of dust is generated during the heat treatment from the contaminated soil 100 and the dust contains 25% in volume of PM 2.5, it is necessary to dispose the first dust-collecting unit 12 downstream of the indirect heating rotary furnace 11 to collect dust. In one embodiment, the first dust-collecting unit 12 includes two ceramic filters 122, 123 disposed in parallel, as shown in FIG. 3. The ceramic filters 122, 123 receive exhaust from pipeline 111, and the exhaust after thermal desorption treatment is sent to the condensing and recovering unit 13 through pipeline 121. The first dust-collecting unit 12 can further include a multitubular dust collector (also called "multitubular cyclone dust collector," not shown in the flow chart) which performs primary screening on larger particles in exhaust from pipeline 111, and then catches smaller particles with the ceramic filters 122, 123. No catalyst is placed in the ceramic filters 122, 123, since the exhaust discharged from the indirect heating rotary furnace has a high temperature of 550 to 650° C. Further, the ceramic filters 122, 123 can be resistant to a high temperature of 900° C., and catch most of dust particles with size of about 0.1 μm using their microporous ceramic fibers. By the parallel disposal, replacement can be done during the continuous process without shutting the apparatus down, and thereby reducing energy consumption, reducing replacement frequency of filter bags, and improving efficiency of the process.

The condensing and recovering unit 13 receives exhaust from pipeline 121, allows mercury vapor in the exhaust to be cooled at a low temperature, and discharges as liquid mercury 130, wherein the temperature of the condensing and recovering unit is set to −30 to 4° C. In one embodiment, the liquid mercury is output at a rate of 0 to 0.6 kg/hr and collected and sealed in a barrel made of polyethylene. The liquid mercury 130 is crude mercury (with a mercury content of about 95 wt %), which needs further rectifying for purification to give pure mercury with a purity of 99.99 wt %. The condensing and recovering unit 13 may includes two stages, wherein exhaust from pipeline 121 is cooled to 4° C. in the first stage, and then is cooled to −30° C. in the second stage. A sulfur-modified active carbon tank (not shown in the flow chart) can be disposed downstream of the condensing and recovering unit 13, and exhaust from the condensing and recovering unit 13 is allowed to adsorb residual mercury and is then sent via a pipeline 131 to the secondary indirect burner 14 where the exhaust is treated to decompose of residual dioxin.

The secondary indirect burner 14 is used for heat treatment of exhaust from the pipeline 131 and decomposition of residual dioxin in the exhaust. The secondary indirect burner 14 is placed horizontally, and has a structure including an outer furnace and an inner furnace, wherein the inner furnace is not a rotary furnace and is heated indirectly by liquid fuel, such as diesel oil, at a temperature set to 850 to 950° C. The decomposition treatment is performed in the secondary indirect burner 14 for at least 2 sec to completely decompose and crack residual dioxin in the exhaust. A heat exchanger (not shown in the flow chart) can be further disposed downstream of the secondary indirect burner 14. Rhw materials in pipeline 141 is cooled to 180 to 220° C. in the heat exchanger by thermal convection with those in the pipeline 131 prior to being sent to the second dust-collecting unit 15, and thereby preventing dioxin from de-novo reaction at the high temperature.

Figure 4:
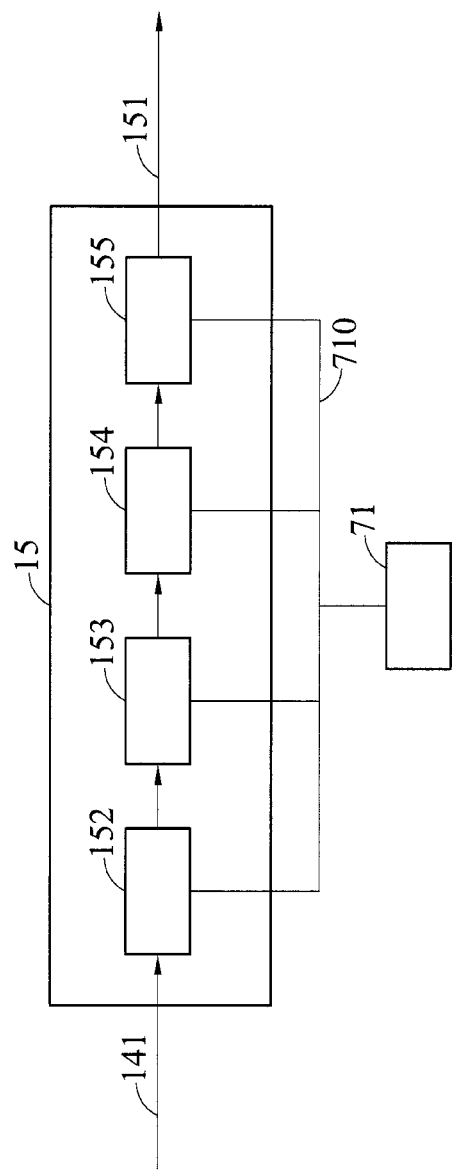
FIG. 4 is a schematic diagram showing a second dust-collecting unit according to an embodiment.

The second dust-collecting unit 15 is used for adsorbing dust in exhaust from the pipeline 141. In one embodiment, the second dust-collecting unit 15 includes at least two dust filters disposed in series, and a catalyst is placed inside at least one of the dust filters. In the embodiment as shown in FIG. 4, the second dust-collecting unit 15 includes four dust filters 152, 153, 154, 155 disposed in series, and a catalyst is placed in at least one of the dust filters, wherein the dust filter 152 is preferably a ceramic filter for receiving high temperature exhaust from the secondary indirect burner 14, and dust filter 154 is particularly preferably a catalyst dust filter and has an air-to-cloth ratio under standard conditions of 1-10 m/hr ($NM^3/M^2/hr$). The catalyst is utilized to decompose residual dioxin in exhaust from the pipeline 141 by contact oxidation taking place at the active sites on surface of the catalyst at a temperature controlled between 200 and 274° C., and thereby decomposing dioxin into oxidation products including $CO_2$, $H_2O$, HCl, etc. In addition, the active ingredient of the catalyst can be at least one selected from $V_2O_5$, $W_2O_3$ and $MoO_3$, the supporting material of the catalyst is $TiO_2$ and oxides thereof, and the form of the catalyst can be at least one selected from particles, honeycombs, blocks and foams. In addition, a sulfur-modified active carbon tank (not shown in the flow chart) can be arranged downstream of the second dust-collecting unit 15 to do completely adsorb residual mercury vapor from the exhaust, and the exhaust finally is delivered via the pipeline 151 to chimney 16 for discharge. The discharged exhaust has a temperature of 180 to 240° C., and generally, contains mercury in an amount less than 0.05 mg/$Nm^3$, dioxin in an amount less than 0.1 ng I-TEQ/$m^3$(ng I-TEQ/$Nm^3$), particle contaminants in an amount less than 80 mg/$Nm^3$, and HCl in an amount less than 40 ppm.

Referring to FIG. 4, in one embodiment, in order to completely remove dioxin in exhaust from the pipeline 141, an active carbon jetting unit 71 is further disposed in parallel to the second dust-collecting unit 15. Thus, fume exhaust passes through the pipeline 710, and is infused into the active carbon for adsorption of dioxin prior to entering each of the dust filters 152, 153, 154, 155. For example, dioxin contaminants are transformed from vapor to solid, and then removed by the dust filters 152, 153, 154, 155. Generally, dioxin in exhaust is removed at an efficiency of 80 to 90%.

Figure 5:
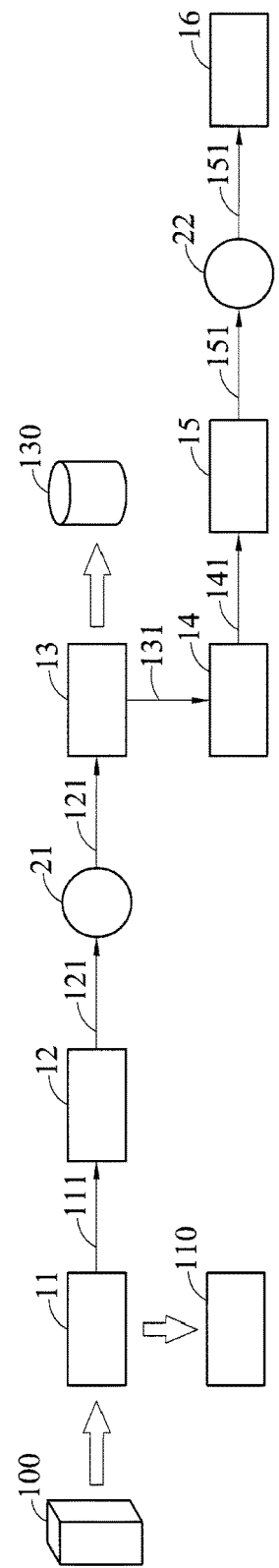
FIG. 5 is a flow chart involving a second example of the apparatus for treating soil contaminated with mercury and dioxin.

Referring to FIG. 5, in one embodiment, enhancement on collection efficiency of dust is achieved by disposing drafting devices 21, 22 downstream of the first dust-collecting unit 12 and the second dust-collecting unit 15 to make the apparatus in a negative pressure environment using a wind pressure, and thereby drawing dust into the first dust-collecting unit 12 and the second dust-collecting unit 15 to prevent formation of filth and subsequent disability of the apparatus caused by dust accumulation.

Figure 6:
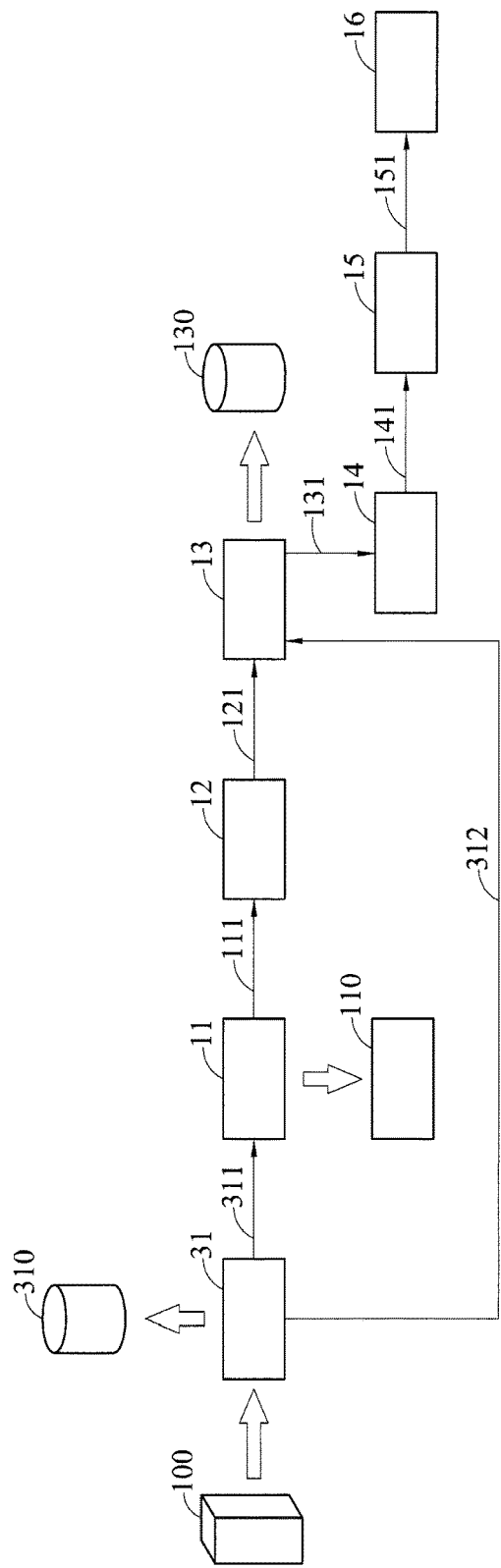
FIG. 6 is a flow chart involving a third example of the apparatus for treating soil contaminated with mercury and dioxin.

Referring to FIG. 6, in one embodiment, in order to enhance efficiency of condensing mercury vapor and operation stability of the condensing and recovering unit 13, prior to heat treating the contaminated soil 100 in the indirect heating rotary furnace 11, water in the contaminated soil 100 is removed by the dewatering unit 31, and the condensed wastewater 310 is discharged after subsequent treatment. The dewatering unit 31 is arranged upstream and communicated with the indirect heating rotary furnace 11, the dewatered contaminated soil is directed via the pipeline 311 into the indirect heating rotary furnace 11, and gas generated during dewatering from contaminated soil 100 is delivered via the pipeline 312 into the condensing and recovering unit 13.

Figure 7:
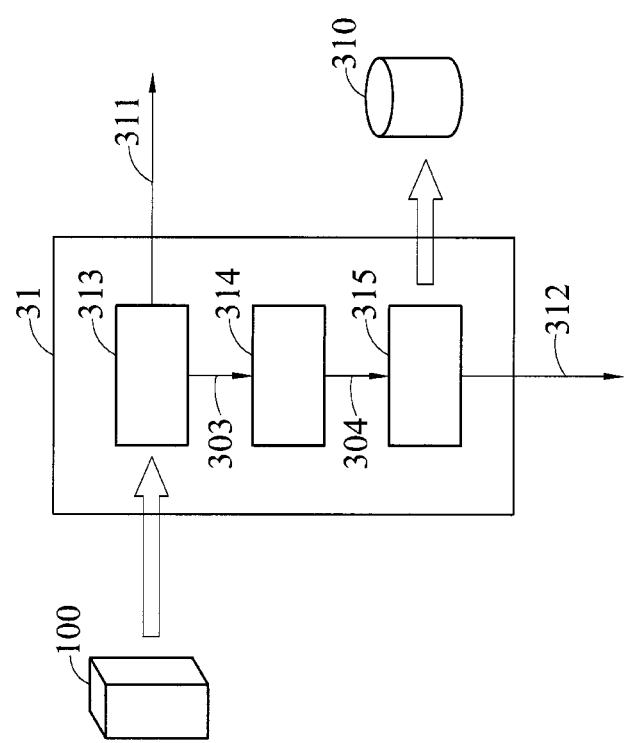
FIG. 7 is a schematic diagram showing a dewatering unit according to an embodiment.

FIG. 7 illustrates one embodiment of the dewatering unit 31, which includes another indirect heating rotary furnace 313, a dust-collecting device 314 and a cooling device 315 in fluid communication with one another in sequence, wherein the another indirect heating rotary furnace 313 has the same structure as the indirect heating rotary furnace 11, and utilizes the same liquid fuel as the latter one. However, cylinder kiln of the another indirect heating rotary furnace 313 inclines at an angle of 1.25 to 5.15 degree, rotates at a speed of 1 to 5 rpm, and runs at a temperature set to 100-200° C., preferably, at a temperature set to 120- to 150° C. for a heat treatment period of 25 to 50 minutes. Further, the dewatered contaminated soil from the another indirect heating rotary furnace 313 is delivered to the indirect heating rotary furnace 11 via the pipeline 311. Additionally, the cooling device 315 cools exhaust containing water vapor to 50° C., and allows water vapor to be condensed into liquid wastewater 310, which is discharged after further treatment. The dewatered exhaust is delivered from the cooling device 315 via the pipeline 312 to the condensing and recovering unit 13. The dust-collecting device 314 is in communication with and between the another indirect heating rotary furnace 313 and the cooling device 315 via the pipelines 303, 304, and is used for adsorbing dust from exhaust generated by the another indirect heating rotary furnace 313, so as to prevent dust from accumulating in the cooling device 315 at the back to avoid the influence on water condensation efficacy of the cooling device 315.

In addition, the another indirect heating rotary furnace 313 has the same structure as the indirect heating rotary furnace 11, and includes a feed hopper; an inner rotary furnace in communication with the feed hopper; an outer fixed furnace covering the inner rotary furnace; and a discharging chamber, wherein the another indirect heating rotary furnace 313 and the indirect heating rotary furnace 11 are in communication with each other via a two-screwed conveyor arranged on the pipeline 311. For example, the inner rotary furnace of the another indirect heating rotary furnace 313 is in communication with the feed hopper of the indirect heating rotary furnace 11, and the contaminated soil in which water vapor has been removed is delivered to the feed hopper (now shown in Figure) of the indirect heating rotary furnace 11 using the two-screwed conveyor.

Figure 8:
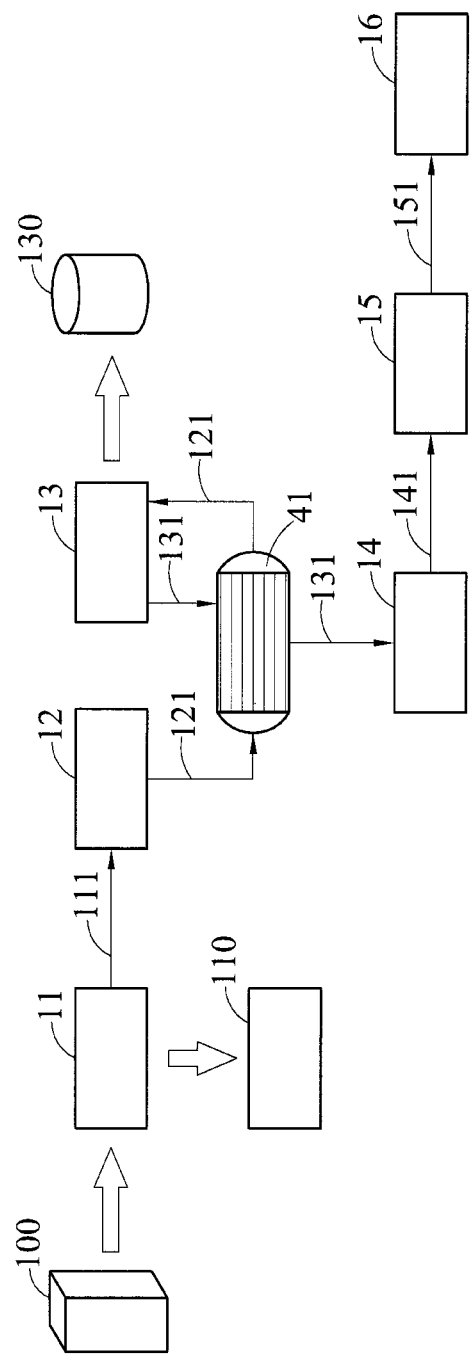
FIG. 8 is a flow chart involving a fourth example of the apparatus for treating soil contaminated with mercury and dioxin.

Referring to FIG. 8, in one embodiment, a heat exchanger 41 is further disposed and in communication with the first dust-collecting unit 12 and the condensing and recovering unit 13 to efficiently use thermal energy. The temperature of pipeline 121 is cooled to 180 to 220° C. and the temperature of pipeline 131 is elevated to 140 to 160° C. by thermal convection between of the lower temperature exhaust in the pipeline 131 from the condensing and recovering unit 13 and the higher temperature exhaust in the pipeline 121 from the first dust-collecting unit 12, and thereby efficiently achieving heat energy recycle and reducing unnecessary energy consumption. Furthermore, since dioxin immediately after decomposition is unstable and would undergo de-novo reaction at 250 to 400° C. to re-form dioxin, the heat exchanger 41 allows the exhaust to be cooled from a high temperature of 550 to 650° C. down to 180 to 220° C. (which is lower than the temperature of 250° C. required for de-novo reaction). By slowing the de-novo reaction at a low temperature and the negative pressure design in the pipelines, the de-novo reaction is inhibited.

In addition, the pipelines mentioned in the present disclosure can be altered depending on the materials they deliver. Thermoresistant pipelines should be utilized if the materials they deliver have high temperature; and anticorrosion pipelines should be utilized for delivering wastewater or exhaust. The selection of materials is well known to a person skilled in the art, and is thus not explained in details.

EXAMPLES

Soil contaminated with mercury and dioxin was dewatered by passing through the another indirect heating rotary furnace of the dewatering unit at 6 tons/hr, wherein the another indirect heating rotary furnace inclined at an angle of 2.6 degree and rotated at 2 rpm, and the dewatering process was carried out at a temperature of 150° C. for about 35 minutes; after dewatering, contaminated soil was delivered through pipelines into the indirect heating rotary furnace for heat treatment, wherein the indirect heating rotary furnace inclined at an angle of 2.5 degrees and rotated at 2.5 rpm, and the heat treatment was carried out at a temperature of 650° C. for about 40 minutes for mercury and dioxin to desorb from contaminated soil. Finally, soil after heat treatment was discharged to the treated soil tank at 4 tons/hr.

The exhaust after heat treatment was dedusted through the multitubular dust collector firstly and then through the first dust-collecting unit consisting of two high temperature ceramic filters arranged in parallel. Thereafter, the exhaust was cooled to 220° C. using the heat exchanger, and then was delivered to the condensing and recovering unit. Similarly, the dewatered exhaust was dedusted through the dust-collecting device firstly and then was cooled to 50° C. via the cooling device, and condensed wastewater was discharged. The dewatered exhaust and the aforementioned exhaust after heat treatment were combined via the pipelines, and delivered into the condensing and recovering unit; immediately, the combined exhaust was cooled to 4° C. via the first stage condenser and was cooled to −30° C. via the second stage condenser to condense mercury vapor in the exhaust into liquid mercury which was discharged at an output rate of 0 to 0.6 kg/hr into a barrel made of polyethylene with the maximum wastewater discharging amount of 50 tons/day.

Subsequently, the residual mercury in exhaust, which had been completely condensed, was adsorbed in the sulfur modified active carbon tank, warmed gradually to 530° C. with the heat exchanger, and subjected to thermal decomposition of dioxin in the secondary indirect burner at a temperature of 900° C. for at least 2 sec. Thereafter, the exhaust was cooled to 220° C. with the heat exchanger to inhibit the de-novo reaction, then entered the four dust filters of the second dust-collecting unit for dust extraction and entered the active carbon jetting unit disposed in parallel for adsorption of dioxin, wherein the dust filters are a high temperature ceramic filter, a catalyst dust filter (REMEDIA; W. L. Gore & Associates, Inc.), and a dust filter in sequence. Finally, the exhaust was delivered to the chimney and discharged, wherein the discharging amount under standard conditions from the chimney is 1,000 m$^3$/hr, and the temperature of the discharged exhaust is 65° C.

Drafting devices are arranged downstream of each dust-collecting device aforementioned to facilitate dust collection.

Several sampling points are set in the recycling apparatus of the present disclosure for sample analysis and the results are recorded in Tables 1 and 2.

TABLE 1

| Ex. 1 | Gas outlet of indirect heating rotary furnace of dewatering unit | Inlet of first dust-collecting unit | Outlet of first dust collecting unit | Inlet of condensing and recovering unit | Outlet of condensing and recovering unit | Inlet of second dust-collecting unit | Outlet of second dust collecting unit |
|---|---|---|---|---|---|---|---|
| Water (%) | 35.8 | 4.8 | 5.6 | 8.6 | 1.8 | 3.8 | 0.9 |
| particle contaminants (mg/m$^3$) | 981.00 | 473.20 | 3.22 | 7.15 | 1.68 | 2.35 | 0.68 |
| dioxin (ng I-TEQ/m$^3$) | 873.70 | 178.60 | 82.70 | 97.30 | 31.50 | 2.50 | 0.05 |
| Mercury and compounds thereof (μg/m$^3$) | 3145.00 | 1154.00 | 615.00 | 598.60 | 118.10 | 48.10 | 8.682 |

TABLE 2

| Ex. 2 | Gas outlet of indirect heating rotary furnace of dewatering unit | Inlet of first dust-collecting unit | Outlet of first dust collecting unit | Inlet of condensing and recovering unit | Outlet of condensing and recovering unit | Inlet of second dust-collecting unit | Outlet of second dust collecting unit |
|---|---|---|---|---|---|---|---|
| Water (%) | 38.9 | 5.7 | 5.65.3 | 6.1 | 2.1 | 4.9 | 1.7 |
| Particle contaminants (mg/m$^3$) | 1011.32 | 508.35 | 5.94 | 8.43 | 2.04 | 1.93 | 0.84 |
| Dioxin (ng I-TEQ/m$^3$) | 1189.74 | 183.78 | 84.01 | 102.27 | 36.69 | 2.81 | 0.06 |

TABLE 2-continued

| Ex. 2 | Gas outlet of indirect heating rotary furnace of dewatering unit | Inlet of first dust-collecting unit | Outlet of first dust collecting unit | Inlet of condensing and recovering unit | Outlet of condensing and recovering unit | Inlet of second dust-collecting unit | Outlet of second dust collecting unit |
|---|---|---|---|---|---|---|---|
| Mercury and its compounds ($\mu g/m^3$) | 3987.24 | 2209.87 | 1098.66 | 784.10 | 279.44 | 205.98 | 28.964 |

Quality detection results of the feed soil, treated soil, condensate wastewater, chimney off-gas and ambient air are recorded in Tables 3-6, respectively.

TABLE 3

| | | Ex. 1 | | Ex. 2 | |
|---|---|---|---|---|---|
| Soil detection | Standard Value | Feeding soil | Treated soil | Feeding soil | Treated soil |
| Mercury (mg/kg) | 20 | 34 | 1.06 | 38.9 | 1.17 |
| Average value of dioxin (ng I-TEQ/$m^3$) | 1000 | 79200 | 205 | 71400 | 90.4 |

TABLE 4

| Quality detection of condensate wastewater | Standard Value | Ex. 1 | Ex. 2 |
|---|---|---|---|
| Suspended solids (mg/L) | 25 | <1.0 | <1.0 |
| Mercury (mg/L) | 0.005 | 0.0049 | 0.0011 |
| Average value of dioxin (pg I-TEQ/$m^3$) | | 20.8 | 24.4 |

TABLE 5

| Detection of chimney off-gas | Standard Value | Ex. 1 | Ex. 2 |
|---|---|---|---|
| Particle contaminants (mg/$m^3$) | 80 | ND (<1.0) | 1.15 |
| Hydrogen chloride (ppm) | 40 | 0.00579 | ND (<2.83) |
| Mercury and compounds thereof (mg/$m^3$) | 0.05 | ND (<0.0006) | ND (<0.0006) |
| Average value of dioxin (ng I-TEQ/$m^3$) | 0.1 | 0.019 | 0.01 |

*Note:
ND means undetected, which is lower than the minimum value capable of being detected by the apparatus used.

TABLE 6

| Ambient air quality monitoring (Annan detecting station) | Standard Value | Ex. 1 | Ex. 2 |
|---|---|---|---|
| Daily average value of suspended particles with sizes smaller than or equal to 10 μm (PM10) (μg/$m^3$) | 125 | 58 to 141 (Monthly average, 78) | 10 to 46 |
| 24 hrs value of suspended particles with sizes smaller than or equal to 25 μm (PM25) (μg/$m^3$) | 35 | 20 to 74 (Monthly average, 37) | ND to 24 |

*Note:
ND means undetected, which is lower than the minimum value capable of being detected by the apparatus used.

In conclusion, the recycling method and apparatus provided in the present disclosure do have the capacity of treating soil highly contaminated with mercury and dioxin at the same time, so as to allow the treated soil and the exhaust to meet the control standards and to reduce dust generated during treatment of the contaminated soil. The process also saves treatment cost for the contaminated soil, as compared to the conventional techniques, and brings about the effect of enhancing stability.

The above examples are used for illustration, rather than for limiting the present disclosure. Anyone skilled in the art can make modifications and alterations on the above examples, without departing from the spirit and scope of the present disclosure. Therefore, the scope of the present application should be defined by the appended claims, and shall be encompassed in the technical content of the present specification so long as it has no influence on the effects and purposes.

The invention claimed is:

1. An apparatus for treating soil contaminated with mercury and dioxin, comprising:
    an indirect heating rotary furnace configured to hold and heat treat the contaminated soil for the mercury and the dioxin to desorb from the contaminated soil to generate exhaust containing the mercury and the dioxin and treated soil;
    a treated soil storage tank in communication with the indirect heating rotary furnace, and configured to receive the treated soil;
    a first dust-collecting unit in fluid communication with the indirect heating rotary furnace, and configured to collect dust from the exhaust;
    a condensing and recovering unit in fluid communication with the first dust-collecting unit, and configured to condense mercury vapor in the exhaust and discharge liquid mercury;
    a secondary indirect burner in fluid communication with the condensing and recovering unit, and configured to heat treat the exhaust and decompose the dioxin in the condensed exhaust;
    a second dust-collecting unit in fluid communication with the secondary indirect burner, and configured to collect the dust from the exhaust in the secondary indirect burner; and
    a chimney in communication with the second dust-collecting unit, and configured to discharge the exhaust from the second dust-collecting unit into air.

2. The apparatus of claim 1, further comprising a dewatering unit disposed upstream of and in communication with the indirect heating rotary furnace, and configured to dewater from the contaminated soil prior to heat treating the contaminated soil, and direct the dewatered contaminated soil into the indirect heating rotary furnace.

3. The apparatus of claim 2, wherein the dewatering unit is further in communication with the condensing and recovering unit to direct gas generated during dewatering from the contaminated soil into the condensing and recovering unit.

4. The apparatus of claim 2, wherein the dewatering unit comprises another indirect heating rotary furnace, a dust-collecting device and a cooling device in fluid communication one with another in sequence, wherein the another indirect heating rotary furnace is further in communication with the indirect heating rotary furnace, and the cooling device is further in fluid communication with the condensing and recovering unit.

5. The apparatus of claim 4, wherein the another indirect heating rotary furnace and the indirect heating rotary furnace each have a structure comprises:
- a feed hopper;
- an inner rotary furnace in communication with the feed hopper;
- an outer fixed furnace covering the inner rotary furnace; and
- a discharging chamber.

6. The apparatus of claim 4, wherein the indirect heating rotary furnace inclines at an angle of from 1.25 to 4.75 degrees, and the another indirect heating rotary furnace inclines at an angle of from 1.25 to 5.15 degrees.

7. The apparatus of claim 1, wherein the first dust-collecting unit comprises two ceramic filters disposed in parallel.

8. The apparatus of claim 1, further comprising two drafting devices disposed following the first dust-collecting unit and the second dust-collecting unit, respectively, for the apparatus to be in a negative pressure environment.

9. The apparatus of claim 1, wherein the second dust-collecting unit comprises at least two dust filters disposed in series.

10. The apparatus of claim 9, wherein a catalyst is placed inside at least one of the dust filters.

11. The apparatus of claim 9, wherein the second dust-collecting unit comprises four dust filters disposed in series.

12. The apparatus of claim 1, further comprising an active carbon jetting unit disposed in parallel to the second dust-collecting unit.

13. The apparatus of claim 1, further comprising a heat exchange device in fluid communication with the first dust-collecting unit and the condensing and recovering unit for the exhaust from the first dust-collecting unit and the exhaust from the condensing and recovering unit to flow in thermal convection.

14. A method for recycling soil contaminated with mercury and dioxin, comprising:
- treating contaminated soil with an indirect heating rotary furnace for the mercury and the dioxin to desorb from the contaminated soil to generate exhaust containing the mercury and the dioxin and treated soil;
- collecting dust from the exhaust with a first dust-collecting unit;
- receiving the exhaust from the first dust-collecting unit by a condensing and recovering unit to condense mercury vapor in the exhaust, and discharging crude mercury as a liquid;
- passing the condensed exhaust through a secondary indirect burner to decompose the dioxin in the condensed exhaust;
- collecting dust from the exhaust in the secondary indirect burner by a second dust-collecting unit; and
- discharging the exhaust from the second dust-collecting unit through a chimney in communication with the second dust-collecting unit into air.

15. The method of claim 14, further comprising dewatering from the contaminated soil by a dewatering unit prior to heat treating the contaminated soil.

16. The method of claim 15, wherein the dewatering unit is set to a temperature from 100° C. to 200° C.

17. The method of claim 14, wherein the indirect heating rotary furnace is set to a temperature from 550° C. to 650° C.

18. The method of claim 17, wherein the indirect heating rotary furnace is set to a time period from 20 minutes to 60 minutes.

19. The method of claim 14, wherein the condensing and recovering unit is set to a temperature from −30° C. to 4° C.

20. The method of claim 14, wherein the secondary indirect burner is set to a temperature from 850° C. to 950° C.

* * * * *